United States Patent [19]

Narisawa et al.

[11] 4,274,993

[45] Jun. 23, 1981

[54] MOLDABLE POLYPHENYLENESULFIDE

[75] Inventors: Shigeyuki Narisawa; Hiroshi Yanase; Fukuo Kanno, all of Yokohama, Japan

[73] Assignee: Asahi Glass Company, Ltd., Tokyo, Japan

[21] Appl. No.: 43,907

[22] Filed: May 30, 1979

[30] Foreign Application Priority Data

May 30, 1978 [JP] Japan ................................. 53-63784
May 30, 1978 [JP] Japan ................................. 53-63785

[51] Int. Cl.³ ............................................. C08L 81/02
[52] U.S. Cl. ................................. 260/37 R; 264/331; 264/176 R; 528/388; 264/210.1; 264/331.11
[58] Field of Search .................... 528/388; 260/37 R; 264/331, 210 R, 176 R

[56] References Cited

U.S. PATENT DOCUMENTS

| | | | |
|---|---|---|---|
| 3,317,487 | 5/1967 | Smith | 528/374 |
| 3,354,129 | 11/1967 | Edmonds, Jr. et al. | 528/388 |
| 3,524,835 | 8/1970 | Edmonds, Jr. et al. | 260/37 R |

OTHER PUBLICATIONS

Short et al., "Polyphenylene Sulfide Coating and Molding Resins", Chemtech, Aug. 1972, pp. 481 to 485.

*Primary Examiner*—Melvyn I. Marquis
*Attorney, Agent, or Firm*—Oblon, Fisher, Spivak, McClelland & Maier

[57] ABSTRACT

A moldable polyphenylenesulfide is obtained by a heat-treatment of a partially crosslinked or noncrosslinked polyphenylenesulfide at a temperature of higher than 290° C. in an atmosphere being substantially absence of oxygen.

11 Claims, 1 Drawing Figure

MOLDABLE POLYPHENYLENESULFIDE

BACKGROUND OF THE INVENTION

1. Field of the Invention

The present invention relates to a moldable polyphenylenesulfide which is used for an injection molding or an extrusion molding. More particularly, it relates to a moldable polyphenylenesulfide from which a molded product having excellent mechanical properties and electrical properties can be obtained though an extrusion molding of a polyphenylenesulfide is considered to be difficult.

2. Description of the Prior Arts

Polyphenylenesulfides are polymers having units

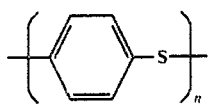

which are usually referred to as PPS. In the specification, the polyphenylenesulfide is referred to as PPS.

PPSs have characteristics for both of a thermoplastic resin and a thermosettable resin and can be moldable by heat-melting as a thermoplastic resin and also crosslinkable as a thermosettable resin such as a curable paint.

PPS molded products have excellent chemical resistance and excellent mechanical property in wide range of a temperature and excellent hardness at high temperature which are required for engineering plastics.

PPSs have been produced, in an industrial scale by Phillips Petroleum Co. Ltd. and commercially available as "RYTON" (trade mark).

It has been known to produce PPSs by various processes. The commercially available PPSs may be produced by reacting p-dichlorobenzene with sodium disulfide in a polar solvent. The commercially available moldable PPSs include V-1 grade (noncrosslinked); P-2, P-3 and P-4 grades (crosslinked; crosslinking degree P-2<P-3<P-4) and R-6 grade (pellet crosslinked) (V-1, P-2, P-3 and P-4: powder) and R-4 grade (glass fiber reinforced pellet). Compositions incorporating a filler, a lubricant or the other additive are also commercially available.

As usages, V-1 is used for a slurry-spray coating and immersing coating; P-2 is used for a fluidized bed coating; P-3 is used for a powder coating; P-4 is used for a compression molding; R-6 is used for an injection molding. The usages are not critical.

The crosslinking reaction of PPS is carried out by heating noncrosslinked PPS in the presence of oxygen usually in air at a temperature of lower than 288° C. as a melting point of the noncrosslinked PPS, preferably at about 250° C. A chain extension is caused together with the crosslinking by the heating, whereby the melt viscosity of PPS substantially increases until it forms an insoluble and non-meltable resin. Usually, at the desired crosslinking degree, PPS is cooled and a moldable powder or pellet is obtained.

The inventors have found various troubles caused by a generation of a gas from PPS in a step of preparating various method products by an injection molding of moldable PPS. The reason is not clear, but it is presumed that the main reason is caused by evaporation and decomposition of low molecular weight PPS from the fact that the low molecular weight PPS is found in the polymer as a byproduct in the polymerization and low molecular weight PPS is formed by partial cleavage of PPS chain in the crosslinking step. The components of the gas are mainly organic materials and small amounts of sulfur compounds such as $SO_2$. The gas is remained in the PPS molded product to deteriorate its mechanical characteristics and electrical characteristics. Moreover, the gas may cause corrosion of a metal mold or an inserted metal.

On the other hand, there is the other disadvantage that molten viscosity is remarkably increased by melting PPS in an injection molding machine.

Since the variation of the molten viscosity is large, it is difficult to maintain the conditions of the injection molding (injection pressure and injection rate) whereby a stable molding cannot be attained.

On the other hand, it has been considered that an extrusion molding of PPS cannot be practically attained.

There is no extrusion molding grade in the commercially available PPSs. The main reason that PPS could not be used for an extrusion molding, is caused by severe variation of molten viscosity of PPS in the processing of PPS. That is, when a partially crosslinked PPS which is commercially available is melt-extruded in an extrusion molding machine, the viscosity of the molten PPS remarkably increased and the degree of the increase of the molten viscosity is not constant but is irregular, whereby it is impossible to extrude a constant amount of the molten PPS. When the molten viscosity is remarkably increased, a rate of the extruded PPS under a constant extrusion pressure is remarkably reduced or sometimes, the extrusion is not performed. It is impossible to apply a method of increasing the extrusion pressure depending upon increasing the molten viscosity because the rate of the increase of the molten viscosity is remarkably high. Accordingly, even though PPS can be extruded by an extrusion molding machine, it has been difficult to obtain a molded product having a desired shape because of variation of the extruding rate. For example, when a sheet is formed by the extrusion molding, the thickness of the sheet is remarkably varied. Sometimes, the sheet is cut by decreasing the extruding rate to zero.

The second reason why the extrusion molding cannot be carried out is remarkably low molten viscosity of noncrosslinked PPS. The molten viscosity of PPS can be increased by increasing crosslinking degree. However, the variation of the molten viscosity of PPS is remarkably increased by increasing the crosslinking degree. It has not been known to obtain PPS having relatively high molten viscosity but low variation of molten viscosity.

The third reason, is to generate the gas in the step of melting PPS. The gas generation causes deterioration of the mechanical characteristics and electrical characteristics as well as those of the injection molding. Moreover, the gas generation may cause corrosion of a metal mold. When a film or a sheet is prepared by the extrusion molding of PPS, there are troubles of formation of voids on its surface or formation of holes. These troubles should be dissolved to attain an extrusion molding of PPS.

Among these troubles, the gas generation and the severe molten viscosity variation are common troubles in both of the injection molding and the extrusion molding. The low molten viscosity is the inherent trouble in the extrusion molding.

If PPS having desired molten viscosity can be obtained, the latter trouble can be overcome. That is, PPS having low molten viscosity can be used for the injection molding whereas PPS having high molten viscosity can be used for the extrusion molding.

SUMMARY OF THE INVENTION

It is an object of the present invention to overcome the above-mentioned three troubles especially to overcome the trouble in an injection molding as well as the trouble in an extrusion molding.

It is another object of the present invention to provide a moldable PPS for an injection molding which caused less gas generation in the molding.

It is the other object of the present invention to provide an improved moldable PPS for an injection molding which results less crosslinkage and less variation of molten viscosity in the molding.

The other object of the present invention is to provide a PPS molded product having excellent mechanical characteristics and electrical characteristics which has less voids.

Still another object of the present invention is to provide an improved moldable PPS which can be used for extrusion molding and which undergoes a lesser extent of crosslinking and exhibits a lesser degree of variation in its molten viscosity during melting.

The further object of the present invention is to provide a moldable partially crosslinked PPS which has relatively high molten viscosity but less variation of molten viscosity in its molten state and which results less gas generation.

The further objects of the present invention is to provide an extrusion molded product of PPS having superior mechanical and electrical characteristics in comparison with those of the products obtained other than the extrusion molding process.

The foregoing and other objects of the present invention have been attained by providing a polyphenylenesulfide which results less gas generation and a desired molten viscosity with less variation of molten viscosity by a heat-treatment of a partially crosslinked or noncrosslinked polyphenylenesulfide at a temperature of higher than 290° C. in an atmosphere being substantially absence of oxygen.

The moldable PPS of the present invention comprises the heat-treated PPS as the main component or at least one component.

DETAILED DESCRIPTION OF THE PREFERRED EMBODIMENTS

Figure 1:
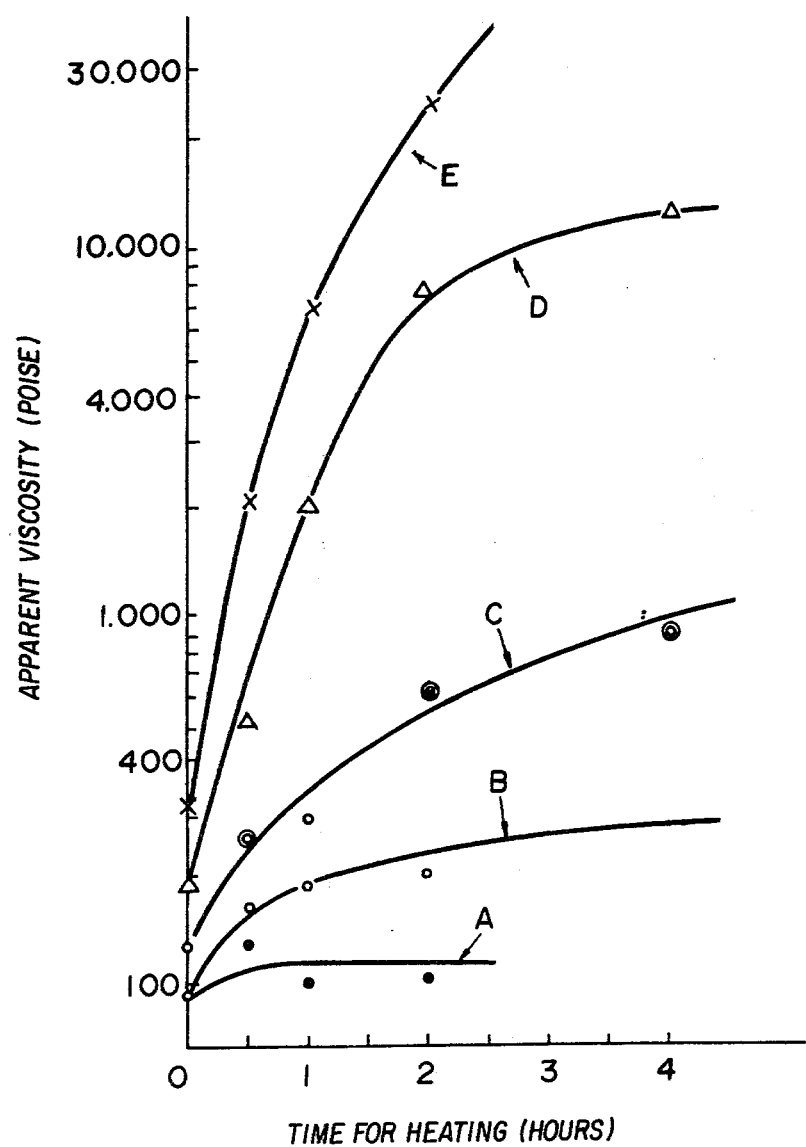

The PPS in the moldable PPS for injection molding or extrusion molding is obtained by the heat-treatment of a partially crosslinked or noncrosslinked PPS at a temperature higher than 290° C. in an atmosphere being substantially free of oxygen.

The moldable PPS results in less gas generation during molding whereby a molded PPS product is obtained having superior mechanical and electrical characteristics in comparison to conventional molded PPS product.

The moldable PPS of the present invention exhibits less variation in melt viscosity (increase of molten viscosity) when melted which means that the molten PPS is stable during injection molding.

PPS having a desired molten viscosity can be obtained by controlling the condition of the heat-treatment.

The moldable PPS for extrusion molding can be obtained by using PPS having relatively high molten viscosity.

It has not been made clear why the variation of molten viscosity caused by the crosslinking reaction by the melting can be remarkably reduced and the gas generation can be reduced by the heat-treatment in an atmosphere substantially free of oxygen. However, it is considered that the crosslinking reaction can be completed by heating it at high temperature in an atmosphere substantially free of oxygen.

That is, a partially crosslinked PPS is produced by heating PPS in the presence of oxygen. It is believed that in this heating step, active points which are activated to be easily crosslinkable but not crosslinked are formed as well as the crosslinking reaction, and the active points are crosslinked for relatively short time at the following heat-treatment.

In accordance with the present invention by heating PPS in the atmosphere being absence of oxygen, the crosslinking reaction of the active points in the partially crosslinked PPS is completed without forming new active points, thereby forming a stable moldable PPS which does not causes further severe crosslinking reaction in the molding process by heating.

Accordingly, the molten viscosity in the melt molding can be adjusted and the variation of the molten viscosity (increase of molten viscosity) can be remarkably reduced by the heat-treatment of the present invention.

The reason why the gas generation is reduced, is to remove components causing the gas generation (such as low molecular weight PPS). In fact, the weight reduction of PPS results by the heat-treatment of the present invention.

An atmosphere which is substantially free of oxygen is one which is an inert gas such as nitrogen gas or a reduced pressure atmosphere. In order to remove the gas generated by the heat-treatment, preferably an atmosphere of reduced pressure is used, although the liberated gas diffuses at high temperature even in an inert gas atmosphere. However, a reduced pressure atmosphere is more effective in removing the residual gas in the PPS. Preferably, the pressure in the treatment vessel is reduced after purging the vessel with an inert gas such as nitrogen gas during the heat-treatment process.

The extent to which pressure is reduced during the heat treatment is not critical in order to achieve an atmosphere substantially free of oxygen, and is preferably lower than 50 mmHg, especially lower than 10 mmHg, when reducing the pressure from an atmosphere of air. It is optimum to perform the heat-treatment in vacuum. The oxygen partial pressure in the atmosphere being substantially free of oxygen is preferably less than 2 mmHg in the reduced pressure atmosphere or the inert gas atmosphere. It believed that in an atmosphere having an oxygen partial pressure of less than 2 mmHg, there is no significant crosslinking caused by oxygen.

The partially crosslinked PPS is obtained by partially crosslinking a noncrosslinked PPS by heating in an atmosphere containing oxygen, and includes the grades of P-2, P-3, P-4 and R-6 of the commercially avilable PPS and also include the R-4 grade incorporating a filler. It is preferable to follow the heat-treatment of the present invention after the crosslinking treatment of the non-crosslinked PPS in view of simplifying the treatments to reduce the cost.

In this case, a desired crosslinking treatment can be performed in a preliminary step prior to the heat-treatment of the present invention. As described below, the preliminary crosslinking treatment affects the heat-treatment of the present invention. It is also effective to perform the heat-treatment of the present invention for the noncrosslinked PPS such as the V-1 grade PPS, since the gas generation can be reduced by removing the low molecular weight PPS contained in the non-crosslinked PPS. It is also possible to conduct the heat-treatment of the present invention by crosslinking the noncrosslinked PPS with a small amount of added oxygen while heating the noncrosslinked PPS at a higher temperature higher than 290° C. in an atmosphere substantially free of oxygen and continuing the heat-treatment, in the same atmosphere freed of oxygen by the cross-linking process.

The temperature during the heat-treatment step of the present invention is higher than the melting point of PPS which is about 290° C. Usually, the partially crosslinked PPS or the noncrosslinked PPS is in a viscous liquid form at temperature higher than the melting point of the PPS. In the conventional crosslinking reaction of PPS, cross-linking has been performed at a temperature lower than its melting point in a powdery form of PPS.

In the heat-treatment of the present invention, PPS is in the liquid form and consequently PPS can be treated in a stationary state or in a fluidized state such as stirring. From the view point of shortening the time for heat-treatment, the temperature is preferably higher than 310° C. The upper limit of the temperature is not critical unless decomposing substantial amount of PPS. It is suitable to be lower than 500° C. The time for the heat-treatment of the present invention in the absence of oxygen is not critical. It is preferable to continue it until reducing the viscosity increasing rate.

In the following embodiment, the heat-treatment step is conducted in an atmosphere substantially free of oxygen. The greater the degree of crosslinking obtained as a result of heating, the greater the increase in viscosity of the PPS product. The viscosity increasing rate is gradually reduced after heating for certain time. It is preferable to continue the heat-treatment until reducing the viscosity increasing rate.

When the temperature of the heat-treatment is higher, the time for reducing the reduction of the viscosity increasing rate can be shorter. Of course, sometimes, it is unnecessary to continue the heat-treatment of the present invention until the rate of viscosity increase is reduced.

The time for melting PPS in the molding is relatively short whereby the variation of the molten viscosity may be negligible sometimes.

The time for the heat-treatment at 300° C. in vacuum is preferably longer than 10 minutes and at 400° C. in vacuum is preferably longer than 30 seconds even though it depends upon the crosslinked degree of PPS.

The low molecular weight compounds which cause gas generation can be removed by the heat-treatment of the present invention, whereby weight loss of the present moldable PPS when heating is reduced. The reduction of the weight loss is advantageous. In order to be practically advantageous, the weight loss is preferably reduced to less than 0.3 wt.%, more preferably less than 0.1 wt.% by the heat-treatment when it is measured by heating PPS at 300° C. under a reduced pressure of several mmHg for 120 minutes in the case of only PPS (no additive such as filler).

On the contrary, the commercially available partially crosslinked PPS exhibits a weight loss of about 0.5 to 2 wt.% under the same conditions.

The time selected for the heat-treatment of the non-crosslinked PPS with oxygen affects the crosslinking degree of PPS. This in turn highly affects the physical properties of the moldable PPS obtained by the heat-treatment of the present invention. One of the physical properties is the apparent viscosity of the PPS obtained by the heat-treatment process. For example, if the time in which the noncrosslinked PPS is heated at 240° C. in air, is long, then the apparent viscosity increasing rate during the subsequent heat-treatment at 330° C. in vacuum is greater and a higher apparent viscosity of the product is reached.

However, when the crosslinked PPS is heat treated in vacuum beyond a certain time period, then the apparent viscosity increasing diminishes.

FIG. 1 is a graph showing the relation of times for the heat-treatment of the partially crosslinked PPS at 330° C. in vacuum (several mmHg) and variation of the apparent viscosity under a load of 20 kg/cm$^2$. In FIG. 1, A designates the curve for the noncrosslinked PPS; B designates the curve for the crosslinked PPS obtained by heating at 240° C. in air for 30 minutes for the crosslinking; C designates that of the heating at 240° C. for 60 minutes; D designates that of the heating at 240° C. for 120 minutes and E designates that of the heating at 240° C. for 240 minutes.

FIG. 1 shows the fact that higher apparent viscosity is given by longer time for the crosslinking treatment and also, the apparent viscosity depends upon the temperature for the crosslinking treatment, the temperature and the time for the heat-treatment of the present invention. Higher apparent viscosity is given by higher temperature or longer time for the treatment.

In view of the apparent viscosity, a desired embodiment of the treatment PPS for extrusion molding is considered. For extrusion molding, the apparent viscosity at 330° C. under a load of 20 kg/cm$^2$ is preferably greater than 500 poises, especially greater than 1,000 poises, although it is possible to be 200 to 500 poises in the case of lower crosslinked PPS or noncrosslinked PPS as shown in FIG. 1. Such PPS is suitable for a moldable PPS for injection molding or a moldable PPS for extrusion molding which is prepared by incorporating an additive such as a filler which increases its viscosity.

After the heat-treatment of the present invention, the treated PPS is usually cooled and pulverized. The treated PPS powder can be used as a moldable PPS. It is also possible to form a pellet type moldable PPS by pelletizing the PPS powder or forming pellets without pulverizing the treated PPS. It is also possible to form the other shaped PPS beside the powder or pellets. The moldable PPS of the present invention can be the treated PPS itself or the mixture of the treated PPS and a non-treated PPS.

It is possible to incorporate various additives in the treated PPS.

Typical additives include glass fiber, carbon fiber, asbestos, other fibrous reinforcing fillers, calcium carbonate, quartz powder, fine glass beads, glass fiber milled powder, graphite and other powdery inorganic fillers. A glass fiber is widely used as a reinforcing filler. The filler can be incorporated into the PPS at relatively high ratio, usually, upto about 80 wt.% in the moldable composition.

It is also possible to incorporate various other additives beside the reinforcing fillers and inorganic fillers. The additives can be fluorinated resins and lubricants such as molybdenum compounds and antimony compounds and synthetic resins such as polyimides.

The content of the additives beside the PPS is not critical and is usually up to 80 wt.%. The lower range of the content is not critical.

The heat-treatment of PPS in the absence of oxygen can be performed in the presence of the additives. For example, the moldable composition of the present invention can be obtained by heat-treating pellets of a mixture of a partially crosslinked PPS and glass fiber (commercially available as R-4 grade) at a temperature higher than 290° C. in an atmosphere being substantially free of oxygen.

The injection molding machine and the molding conditions employed for the injection molding of the moldable PPS are not critical. In the conventional injection molding of PPS, heavy duty machines and various special molding machines have been employed depending upon the molded products. The moldable PPS of the present invention can be molded by the same molding machines under the same molding conditions.

The injection molding of PPS has the advantageous feature that PPS is moldable under relatively low pressure. The moldable PPS of the present invention can be molded to have similar advantage.

The injection molding process of the present invention is a process in which molten PPS is injected into a mold to mold it. The injection can be carried out by a plunger or a screw. The injection molding process is usually applied for molding a thermoplastic resin. A transfer molding process is usually applied for molding a thermosettable resin. The principles of the molding processes are not substantially different though resin feeding parts are different.

As described above, PPS is a thermoplastic resin as well as a thermosettable resin. Accordingly, the injection molding process and transfer molding process can be applied for molding PPS.

In view of the special characteristics of PPS, the injection molding process should be considered to include the transfer molding process and means the process for injecting a molten resin into a mold to mold it.

The condition for extrusion molding process and the type of an extrusion molding machine are not critical as well as those of the injection molding process. It is also possible to use a special extrusion machine such as an electric wire coating extrusion as well as the usual extrusion molding machines.

Heretofore, pellet type moldable PPS has been prepared by extruding PPS itself or a composition of PPS and a filler etc. into pellets. However, the objective of this extrusion is to knead or pelletize the pelletizing, PPS, not to obtain a molded product. Accordingly, for pelletization, a specific shape has not been required. In fact, the pellets containing a filler obtained by the extrusion have had irregular shapes which can not compare with uniform pellets of the other thermoplastic resins.

The extrusion molding process for the moldable PPS of the present invention is a molding process for preparing final products having a specific size in high accuracy such as rod, pipe and sheet. Of course, when a pellet type molded product is required as one kind of molded product, the pelletization by the extrusion can be carried out.

The molded product obtained by an injection molding of the moldable PPS of the present invention has improved characteristics of various mechanical and electrical characteristics or appearance of molded products in comparison with those of the conventional procucts. For example, a bending strength, a tensile strength and an impact strength are remarkably improved. For example, the strength of a glass fiber reinforced PPS molded product has been improved for from 10 to 50% in comparison with those of the conventional ones. Moreover, when the moldable PPS of the present invention is used, a formation of voids in the molded product is remarkably reduced. When a filler is incorporated, the adhesiveness of PPS to the filler is improved whereby a water immersion can be prevented to improve a deterioration of the electrical characteristics such as a reduction of a volume resistivity caused by maintaining the molded product in boiling water or in high moisture atmosphere. Moreover, the gas generation in the molding process can be remarkably reduced in comparison with the conventional ones, whereby an injection molded product having excellent appearance without gas voids can be obtained. The environmental pollution caused a gas generation can be prevented.

Kinds of the molded products obtained by an injection molding of the moldable PPS of the present invention are not critical. For example, various shapes of molded products obtained by the conventional injection moldings of the synthetic resins can be obtained.

In the following examples, test pieces defined by various standard tests for physical properties such as strength are prepared. However, in the practical molding, the shapes of the molded products are not limited to the shape of the test pieces.

The molded products obtained by using the injection moldable PPS of the present invention can be used in the fields of electric parts, electronic parts, anticorrosive equipments, heat resistant equipments and mechanical parts and various other industrial fields.

Kinds of the molded products obtained by an extrusion molding of the moldable PPS of the present invention are not critical. For example, they can be rods, angles, channels, sheets, films, pipes and electric wire coating.

As a general problem, when a molded product can not be prepared by an extrusion molding process, the cost for preparing a shaped product by other process on an industrial scale are too high.

The molded products can be easily obtained by an extrusion molding of the moldable PPS of the present invention as the extrusion molding of the other synthetic resins.

The moldable PPS of the present invention can be used for the extrusion molding process. Moreover, the gas generation in the molding process can be remarkably reduced to overcome the troubles caused by the gas generation in the molding process.

Moreover, the deterioration of the mechanical and electrical characteristics of the molded products caused by the remaining of the gas can be reduced to improve the characteristics of the molded PPS.

The molded products obtained by using the extrusion moldable PPS of the present invention can be used in the fields of electric parts, electronic parts, anticorrosive equipments, heat resistant equipments, and mechanical parts for imparting the characteristics of PPS and also various other industrial fields.

The present invention will be further illustrated by certain examples and references which are provided for purposes of illustration only and are not intended to be limiting the present invention.

REFERENCE 1

The polyphenylenesulfides used in the references and examples are commercially available PPS "RYTON" manufactured by Phillips Petroleum Co., Ltd. and are shown by grades defined by the company.

The commercially available noncrosslinked PPS powder (V-1 grade), the partially crosslinked PPS powder (P-4 grade) and the partially crosslinked pellets (R-6 grade) were respectively heated at 330° C. for 15 minutes in vacuum to melt them and were cooled to solidify them whereby solid PPSs having no void in their inner parts were respectively obtained. (In the references and examples, "in vacuum" means the condition reducing the pressure in air with PPS to several mmHg).

As references, the non-treated commercially available PPSs: V-1 grade, P-4 grade, and R-6 grade were respectively heated at 300° C. for 15 minutes in air, whereby solid PPSs having many voids caused by the gas generation in their inner parts were respectively obtained.

REFERENCE 2

Each of the samples obtained by the heat-treatment, in vacuum, of Reference 1 (heat-treated V-1, heat-treated P-4, heat-treated R-6) was sampled for about 2 g in a porcelain crucible and heated at 300° C. for 120 minutes under a reduced pressure of several mmHg to measure each weight loss from the precisely weighed sample. Results are shown in Table 1.

As references, the commercially available PPSs (V-1, P-4 and R-6) were respectively heated in the same condition to measure each weight loss. Results are also shown in Table 1.

TABLE 1

|  | PPS grade | Heat-treatment of Invention | Weight loss (wt.%) |
|---|---|---|---|
| Invention | V-1 | treated | 0.04 |
|  | P-4 | treated | 0.03 |
|  | R-6 | treated | 0.04 |
| Comparative Reference | V-1 | none | 1.50 |
|  | P-4 | none | 0.70 |
|  | R-6 | none | 0.70 |

REFERENCE 3

The commercially available noncrosslinked PPS powder (V-1 grade) was heated at 240° C. for 60 minutes in air flow to perform the crosslinking treatment and then, the product was further heated at 330° C. for 120 minutes in vacuum. The resulting sample was cooled and pulverized. An apparent viscosity of the molten sample at 300° C. under a load of 20 kg/cm² was measured to give 650 poises.

In a porcelain crucible, about 10 g of the sample was charged and heated at 330° C. for 30 minutes in air flow. An apparent viscosity of the treated sample was measured in the same condition, to give 750 poises. An increase of the apparent viscosity was remarkably small.

On the other hand, an apparent viscosity of the commercially available partially crosslinked PPS powder (P-3 grade) was measured in the same condition to give 720 poises.

In a porcelain crucible, about 10 g of the P-3 grade PPS powder was charged and heated at 330° C. for 30 minutes in air flow to give 4,000 poises. An increase of the apparent viscosity was remarkably large.

REFERENCE 4

The reference shows the fact various moldable PPSs having various apparent viscosities and small variations of viscosity could be obtained by the heat-treatments of the present invention.

The commercially available noncrosslinked PPS powder (V-1 grade) was crosslinked by heating in the conditions shown in Table 2 and then, heat-treated in vacuum in the conditions shown in Table 2. The resulting PPSs were respectively pulverized and then, heated at 330° C. for 30 minutes in air flow in the same condition of Reference 3.

Apparent viscosities of the PPS after the heat-treatments in vacuum and apparent viscosities of the PPSs after heating in air flow were respectively measured. Results are shown in Table 2 (the same condition of Reference 3). As reference, an apparent viscosity of the sample of the partially crosslinked PPS which is not treated by the heat-treatment of the invention, was also measured and shown in Table 2.

TABLE 2

|  |  | Condition of treatment | | Variation of viscosity by heating in air flow | |
|---|---|---|---|---|---|
|  | PPS grade | Condition for cross-linking | Condition for heat-treatment in vacuum | Viscosity before heating in air flow (poise) | Condition for heating in air flow | Viscosity after heating in air flow (poise) |
| Invention No. 1 | V-1 | 240° C. 80 min | 330° C. 120 min | 1,600 | 330° C. 30 min | 1,880 |
| No. 2 | V-1 | 240° C. 100 min | 330° C. 120 min | 3,500 | 330° C. 30 min | 4,170 |
| No. 3 | V-1 | 240° C. 120 min | 330° C. 120 min | 7,500 | 330° C. 30min | 9,100 |
| Comparative Ref. No. 1 | P-4 grade PPS powder | | | 1,500 | 330° C. 30 min | 5,500 |
| No. 2 | V-1 | 260° C. 240 min | — | 4,200 | 330° C. 30 min | 16,000 |
| No. 3 | V-1 | 260° C. 360 min | — | 7,200 | 330° C. 30 min | 28,100 |

EXAMPLE 1

The noncrosslinked PPS (V-1 grade) was heated at 240° C. for 120 minutes in air and then, heated at 330° C. for 120 minutes in vacuum and then, cooled and pulverized. The product was admixed with glass fiber chopped strand at a ratio of 40 wt. % and the mixture was extruded by an extruder to form pellets.

In accordance with the same process, the noncrosslinked PPS was heated at 240° C. for 60 minutes in air and then, heated at 330° C. for 120 minutes in vacuum and then, glass fiber chopped strand was admixed to obtain pellets containing glass fiber at a ratio of 40 wt. %.

As reference, the noncrosslinked PPS (V-1 grade) was heated at 240° C. for 120 minutes in air or heated at 240° C. for 60 minutes in air. Each products was admixed with glass fiber chopped strand at a ratio of 40 wt. % and the mixture was also extruded to form pellets.

Various test pieces were prepared by an injection molding from these pellets of the moldable PPSs and their physical properties were measured. Results are shown in Table 3.

The injection molding was carried out by using a normal injection molding machine under the condition of a cylinder temperature of 330° C., an injection pressure of 1,100 kg/cm² and a mold temperature of 130° C. (In the following exaples, the conditions are the same).

TABLE 3

| Heat-treatment of PPS | 240° C. in air<br>330° C. in vacuum | Exp.<br>120 min<br>120 min | Ref.<br>120 min<br>— | Exp.<br>60 min<br>120 min | Ref.<br>60 min<br>— |
|---|---|---|---|---|---|
| Physical property | | | | | |
| Bending strength (ASTM-D790) (kg/mm²) | | 24.0 | 18.6 | 23.5 | 17.9 |
| Tensile strength (ASTM-D638) (kg/mm²) | | 17.3 | 14.6 | 16.8 | 14.1 |
| Impact strength (notched) (kg · cm/cm²) (ASTM-D256) | | 10.0 | 6.5 | 10.5 | 6.8 |

EXAMPLE 2

The noncrosslinked PPS powder (V-1 grade) was heated at 260° C. for 60 minutes in air to crosslink it and then, further heated at 350° C. for 120 minutes in a pressurized nitrogen gas (pressure of 1.3 kg/cm²; oxygen partial pressure of 1.95 mmHg; $N_2$ content 99.8%) and the product was cooled and pulverized. The product was admixed with glass fiber chopped strand at a ratio of 30 wt. % and the mixture was extruded by an extruder to form pellets.

As reference, the noncrosslinked PPS (V-1 grade) was heated at 260° C. for 60 minutes in air. The product was admixed with glass fiber chopped strand at a ratio of 30 wt. % and the mixture was also extruded to form pellets.

Various test pieces were prepared by an injection molding from these pellets of the moldable PPSs and their physical properties were measured. Results are shown in Table 4.

TABLE 4

| Heat-treatment of PPS | Condition in air<br>Condition in $N_2$ | Example<br>260° C.; 60 min<br>350° C.; 120 min | Reference<br>260° C.; 60 min<br>— |
|---|---|---|---|
| Physical property | | | |
| Bending strength (ASTM-D790) (kg/mm²) | | 18.7 | 14.0 |
| Tensile strength (ASTM-D638) (kg/mm²) | | 14.8 | 12.1 |
| Impact strength (notched) (ASTM-D256) (kg · cm/cm²) | | 7.0 | 5.5 |

EXAMPLE 3

The partially crosslinked PPS powder (P-4 grade) and the noncrosslinked PPS powder (V-1 grade) were respectively heated at 320° C. for 90 minutes in vacuum. Each sample was cooled and pulverized and admixed with quartz powder (Fuselex E-1 manufactured by Tatsumori K.K.) and glass fiber chopped strand at ratios shown in Table 5 and each mixture was extruded by an extruder to form pellets.

As reference, the non-treated PPS powders (P-4 grade and V-1 grade) were admixed with quartz powder and glass fiber chopped strand at the same ratios and each mixture was extruded to form pellets.

Each disc test piece (diameter of 50 mm, thickness of 3 mm) was prepared by an injection molding from each pellet modable composition. These test pieces were maintained in an atmosphere of high humidity or boiled in water and then, volume resistivities of the treated test pieces were measured. Water absorptions of the boiled test pieces were also measured.

Test conditions and results of the measurements are shown in Table 6.

TABLE 5

| | | Content (wt.%) | | | |
|---|---|---|---|---|---|
| | | P-4 grade | V-1 grade | Quartz powder | Glass fiber chopped strand |
| Example | test No. 1 | 30 (treated) | 20 (treated) | 30 | 20 |
| | test No. 2 | — | 30 (treated) | 50 | 20 |
| Reference | Ref. No. 1 | 30 (non-treated) | 20 (non-treated) | 30 | 20 |
| | Ref. No. 2 | — | 30 (non-treated) | 50 | 20 |

TABLE 6

| | | Variation of volume resistivity[1] | | | Water absorption (wt. %) (After 100 hr. in boiling) |
|---|---|---|---|---|---|
| | | Initial value (Ω-cm) | After[2] 1000 hr. in high humidity (Ω-cm) | After[3] 100 hr. in boiling (Ω-cm) | |
| Example | test No. 1 | $8.0 \times 10^{15}$ | $6.0 \times 10^{15}$ | $1.1 \times 10^{15}$ | 0.2 |
| | test No. 2 | $5.0 \times 10^{15}$ | $3.3 \times 10^{15}$ | $0.7 \times 10^{15}$ | 0.2 |
| Reference | Ref. No. 1 | $4.0 \times 10^{15}$ | $5.4 \ 10^{13}$ | $7.5 \times 10^{10}$ | 1.3 |
| | Ref. No. 2 | $1.5 \times 10^{15}$ | $2.8 \times 10^{13}$ | $9.3 \times 10^{8}$ | 1.7 |

Note:
[1] ASTM-D-257
[2] Test piece is maintained in a vessel (70° C., 90% relative humidity) for 1,000 hours.
[3] Test piece is boiled in a distilled water at 100° C. for 100 hours.

EXAMPLE 4

The noncrosslinked PPS powder (V-1 grade) was heated at 240° C. for 120 minutes an air flow to crosslink it and then, heated in vacuum in the conditions shown in Table 7. The products were cooled and pulverized and extruded to form pellets. Various test pieces were prepared by molding by an injection molding machine and various properties of the test pieces were measured. Results are shown in Table 7.

As reference, the partially crosslinked PPS pellets (R-6 grade) were molded without the heat-treatment of the invention and various properties of the test piece were also measured. Results are also shown in Table 7.

TABLE 7

| | | Example | | | Reference |
|---|---|---|---|---|---|
| | | Test No. 1 | Test No. 2 | Test No. 3 | R-6 grade pellets |
| Heat-treatment of PPS | heating in air | 240° C. 120min | 240° C. 120min | 240° C. 120min | — |
| | heating in vacuum | 330° C. 120min | 360° C. 60min | 420° C. 60min | — |
| Physical property | | | | | |
| Bending strength (ASTM-D-790)(kg/mm²) | | 12.1 | 13.1 | 14.0 | 9.3 |
| Tensile strength (ASTM-D638)(kg/mm²) | | 6.5 | 6.8 | 7.7 | 5.0 |
| Impact strength (notched)(kg · cm/cm²) (ASTM-D256) | | 2.7 | 3.1 | 3.8 | 1.8 |

EXAMPLE 5

The noncrosslinked PPS powder (V-1 grade) was heated at 330° C. for 120 minutes in vacuum and cooled and pulverized. The product was admixed with glass fiber chopped strand and fine clay (ASP 400 grade manufactured by Tsuchiya Kaolin K.K.) and the mixture was extruded by an extruder to form moldable pellets having a glass fiber content of 40 wt. % and a clay content of 40 wt. %.

The noncrosslinked PPS (V-1 grade) had low apparent viscosity whereby a melt flowability in the molding was high even though a large amounts of the fillers were incorporated. And injection molding could be performed.

As reference, the noncrosslinked PPS (V-1 grade) was blended with the same components to form pellets. Various test pieces were prepared by molding by an injection molding and various properties of the test pieces were measured. Results are shown in Table 8.

TABLE 8

| | Example | Reference |
|---|---|---|
| Physical property | | |
| Bending strength(ASTM-D790)(kg/mm²) | 19.6 | 14.0 |
| Tensile strength(ASTM-D638)(kg/mm²) | 14.2 | 11.3 |
| Impact strength (notched) (ASTM-D256)(kg · cm²) | 6.5 | 4.0 |
| Inner voids of test piece having thickness of 6 mm | none | fine voids in inner parts |

EXAMPLE 6

The glass fiber reinforced PPS pellets (R-4 grade: glass fiber content of 40 wt. %) was heated at 300° C. for 150 minutes in vacuum and cooled and pulverized to form the flaky composition. Various test pieces were prepared by an injection molding from the flaky composition and various physical properties of the test pieces were measured.

As reference, the glass fiber reinforced PPS pellets (R-4 grade) were molded without the heat-treatment. Results of the physical properties and appearances are shown in Table 9.

TABLE 9

| | Example | Reference |
|---|---|---|
| Condition of heat-treatment in vacuum | 300° C. 150 min | — |
| Gas generation in injection molding | negligible | remarkable |
| Appearance of molded product | glossy | gas voids at edges |
| Physical property | | |
| Bending strength(ASTM-D790)(kg/mm²) | 20.7 | 16.0 |
| Tensile strength(ASTM-D638)(kg/mm²) | 15.8 | 13.1 |
| Impact strength (notched) (ASTM-D256)(kg · cm/cm²) | 7.5 | 4.5 |

EXAMPLE 7

The noncrosslinked PPS powder (V-1 grade) was heated at 260° C. for 120 minutes in air to crosslink it and then, heated at 330° C. for 120 minutes in vacuum. The product was cooled to room temperature and pulverized by a speed mill (manufactured by Hourai Tekkosha K.K.) to form powder. The powder was charged into a uniaxial extruder having a diameter of screw of 20 mm and extruded at a cylinder temperature of 320° C. and a die temperature of 320° C. at a screw speed of 30 r.p.m. to form a film having a thickness of 60μ and a width of 14 cm. The resulting film was dark brown semi-transparent and had no void and was not broken by bending it.

As reference, the partially crosslinked PPS pellets (R-6 grade) was extruded in the same condition. Because of a gas generation from the PPS, many holes were formed on the film. The extruding rate was remarkably varied during the extrusion. The film of the Reference had less flexibility and was easily broken by bending it.

EXAMPLE 8

The noncrosslinked PPS powder (V-1 grade) was heated at 240° C. for 60 minutes in air to crosslink it and then, further heated at 360° C. for 40 minutes in vacuum. The product was cooled and pulverized with glass fiber chopped strand (CS-03-MA-497 manufactured by Asahi Fiber Glass K.K.) and quartz powder (Fuselex E-1 manufactured by Tatsumori K.K.) to give 20 wt. % of glass fiber content and 20 wt. % of quartz powder. The mixture was extruded by an extruder to form pellets.

As reference, the PPS powder (P-4 grade) was admixed with the fillers without the heat-treatment at the same ratios and the mixture was extruded to form pellets.

The pellets were respectively charged into an uniaxial extruder having a diameter of screw of 40 mm and extruded at a cylinder temperature of 320° C. and a die temperature of 320° C. at a screw speed of 20–30 r.p.m. under an extrusion pressure of 60 kg/cm² to form rods having a diameter of 20 mm.

The molded product obtained from the pellets of the Example was a molded rod having smooth surface without void in the inner part and uniform structure. The molded rod could not be broken by striking with a wooden hammer.

On the other hand, the molded product obtained from the pellets of the Reference had many voids in the inner part and deformed joint parts caused by fluctuation of an extrusion rate for each 20–30 cm. When the molded product having a length of 1 m was dropped from 1 m height on a concrete floor, the molded product was broken into 4–5 pieces.

EXAMPLE 9

The noncrosslinked PPS powder (V-1 grade) was heated at 260° C. for 120 minutes in air flow to crosslink it and then, further heated at 330° C. for 120 minutes in vacuum. The product was cooled and pulverized and admixed with glass fiber chopped strand (CS-03-MA-497 manufactured by Asahi Fiber Glass K.K.) to give 30 wt. % of glass fiber content. The mixture was extruded by an extruder to form pellets. The pellets were charged into an uniaxial extruder having a diameter of screw of 40 mm and extruded at a cylinder temperature of 320° C. and a die temerature of 320° C. at a screw speed of 20–30 r.p.m. under an extrusion pressure of 60 kg/cm$^2$ to form a sheet having a thickness of 2 mm and a width of 15 cm. The resulting sheet had smooth surface and had no void on its surface or its inner part.

Various test pieces were cut out from the sheet and various properties were measured. Results are shown in Table 10.

As reference, the partially crosslinked PPS powder (P-4 grade) was admixed with glass fiber chopped strand to give 30 wt. % of glass fiber content. The mixture was extruded by an extruder to form pellets. The pellets were extruded to form a sheet in the same condition.

In the Reference, because of gas generated from the PPS, many voids were formed in the sheet and the surface was rough and an ununiform sheet was formed by fluctuation of an extrusion rate.

In order to compare physical properties of the molded products, test pieces were molded by a compression molding.

Pellets having a glass fiber content of 30 wt. % were prepared by using the PPS powder (P-4 grade) and heated at 330° C. for 60 minutes in air flow to crosslink them and charged into a mold for a flat plate and the mold was heated at 300° C. and compressed under the pressure of 100 kg/cm$^2$ for 10 minutes. The product was cooled to room temperature in the mold under the pressure to obtain a flat plate having a thickness of 2 mm, a length of 20 cm and a width of 20 cm. Various test pieces were cut out from the flat plate and various physical properties were measured. Results are shown in Table 10.

TABLE 10

|  |  | Example | Reference | |
| --- | --- | --- | --- | --- |
|  | Test method | Extrusion molded product | Extrusion molded product | Compression molded product |
| Appearance of molded product | Observation | good | rough | good |
| Inner void | Observation | none | quite | many |
| Mechanical strength |  |  |  |  |
| Bending strength (kg/mm$^2$) | ASTM D790 | 14.5 | — | 5.5 |
| Tensile strength (kg/mm$^2$) | ASTM D638 | 12.1 | — | 4.0 |
| Electrical property |  |  |  |  |
| Volume resistivity (Ω-cm) Initial | ASTM D257 | 7.9 × 10$^{15}$ | — | 9.3 × 10$^{13}$ |
| Boiled for 100 hr. | ASTM D257 | 4.8 × 10$^{15}$ | — | 2.5 × 10$^8$ |

What is claimed is:

1. A moldable polyphenylenesulfide for injection or extrusion molding obtained by heat-treating a partially cross-linked polyphenylenesulfide at a temperature greater than 290° C. in an atmosphere substantially free of oxygen, said partially cross-linked polyphenylenesulfide being obtained by heating noncrosslinked polyphenylenesulfide at a temperature lower than its melting point in the presence of oxygen.

2. The moldable polyphenylenesulfide according to claim 1 wherein said atmosphere substantially free of oxygen is a reduced pressure atmosphere.

3. The moldable polyphenylenesulfide according to claim 1 wherein the atmosphere substantially free of oxygen is an inert gas atmosphere having an oxygen partial pressure of less than 2 mmHg.

4. The moldable polyphenylenesulfide according to claim 1 wherein the temerature for the heat-treatment ranges from 310° C. to 500° C.

5. The moldable polyphenylenesulfide according to claim 1 wherein the weight loss of the treated polyphenylenesulfide measured by heating at 300° C. for 120 minutes in vacuum is less than 0.3 wt. %.

6. The moldable polyphenylenesulfide according to claim 2, 3, 4, 5, or 1 wherein a filler is incorporated in said partially crosslinked polyphenylenesulfide before or after the heat-treatment.

7. The moldable polyphenylenesulfide according to claim 6 wherein the filler is glass fiber.

8. The moldable polyphenylenesulfide according to claim 6, wherein said filler is incorporated in said partially crosslinked polyphenylenesulfide in an amount of up to about 80 weight percent.

9. The moldable polyphenylenesulfide according to claim 1, wherein said partially crosslinked polyphenylenesulfide is obtained by heating a noncrosslinked polypheneylenesulfide at a temperature lower than its melting point in the presence of oxygen to achieve the desired degree of crosslinking, and then heating said partially crosslinked polyphenylenesulfide at a temperature higher than its melting point in a vacuum or under an inert gas atmosphere to prevent further substantial crosslinking of said partially crosslinked polyphenylenesulfide.

10. A molded polyphenylenesulfide which is obtained by injection molding or extrusion molding of the moldable polyphenylenesulfide of claim 2, 3, 4, 5 or 1.

11. The moldable polyphenylenesulfide according to claim 1, wherein said moldable polyphenylenesulfide has an apparent viscosity at 330° C. under a load of 20 kg/cm$^2$ > 500 poises.

* * * * *